United States Patent [19]
Estelle

[11] Patent Number: 5,602,676
[45] Date of Patent: Feb. 11, 1997

[54] COMPACT ZOOM LENS WITH REDUCED ASPHERIC DECENTER SENSITIVITY

[75] Inventor: Lee R. Estelle, Rochester, N.Y.

[73] Assignee: Eastman Kodak Company, Rochester, N.Y.

[21] Appl. No.: 347,612

[22] Filed: Nov. 30, 1994

[51] Int. Cl.$^6$ .................................................. G02B 27/64
[52] U.S. Cl. ......................... 359/557; 359/692; 359/708
[58] Field of Search .................................. 359/557, 554, 359/692, 708, 714

[56] References Cited

U.S. PATENT DOCUMENTS

| | | | |
|---|---|---|---|
| 4,772,106 | 9/1988 | Ogata et al. | 350/427 |
| 4,815,830 | 3/1989 | Sato et al. | 350/427 |
| 4,830,476 | 5/1989 | Aoki | 350/427 |
| 4,883,346 | 11/1989 | Aoki et al. | 350/423 |
| 4,907,868 | 3/1990 | Kitagishi et al. | 359/557 |
| 4,936,661 | 6/1990 | Betensky et al. | 350/423 |
| 4,953,957 | 9/1990 | Kobayashi | 350/423 |
| 4,963,010 | 10/1990 | Kikuchi | 350/481 |
| 5,000,549 | 3/1991 | Yamazaki | 359/557 |
| 5,071,235 | 12/1991 | Mori et al. | 359/692 |
| 5,162,947 | 11/1992 | Ito | 359/692 |
| 5,168,403 | 12/1992 | Umeda et al. | 359/692 |
| 5,218,478 | 6/1993 | Itoh | 359/692 |
| 5,268,792 | 12/1993 | Kreitzer et al. | 359/676 |
| 5,270,867 | 12/1993 | Estelle | 359/692 |
| 5,274,504 | 12/1993 | Itoh | 359/676 |
| 5,283,693 | 2/1994 | Kohno et al. | 359/691 |

FOREIGN PATENT DOCUMENTS

| | | | | |
|---|---|---|---|---|
| 4-42114A | 2/1992 | Japan | | G02B 15/16 |
| 2262164A | 6/1993 | United Kingdom | | G02B 15/14 |
| 2263345A | 7/1993 | United Kingdom | | G02B 15/14 |

Primary Examiner—Timothy P. Callahan
Assistant Examiner—Eunja Shin
Attorney, Agent, or Firm—Svetlana Z. Short

[57] ABSTRACT

A zoom lens having two units of lens components including from the object side a positive optical unit and a negative optical unit. The positive optical unit includes two lens components, a weak power lens component, and a second positive power lens component, while the negative optical unit provides most of the magnification change during zooming. The zoom lens has reduced aspheric decenter sensitivity.

33 Claims, 3 Drawing Sheets

COMPACT ZOOM LENS WITH REDUCED ASPHERIC DECENTER SENSITIVITY

CROSS-REFERENCE TO RELATED APPLICATIONS

This application is related to U.S. Ser. No. 08/346,729, filed concurrently herewith, entitled COMPACT 3× ZOOM-LENS, in the name of Lee R. Estelle.

BACKGROUND OF THE INVENTION

1. Field of the Invention

This invention relates to compact zoom lenses. Although the invention has general application, it is particularly usable in still photographic cameras.

2. Background Art

U.S. Pat. No. 5,270,867 to Lee R. Estelle, issued Dec. 14, 1993, describes zoom lenses (or zoom lens systems) having two units of lens components—a positive front unit and a negative rear unit. The disclosed zoom lenses utilize only three or four lens components and still achieve very good aberration correction for zoom ranges 1:2 and aperture ratios of f/8 to f/11.

U.S. Pat. No. 4,936,661 to E. I. Betensky et al., issued Jun. 26, 1990, describes a zoom lens with a short back focal length and having, from front to rear, negative, positive and negative optical units. The negative unit closest to the image is movable during zooming to provide a majority of the change in focal length. In some of the examples, the front two units move as a single optical group during zooming, and in others they move relative to each other during zooming. These lenses have remarkable corrections and compactness for their aperture, zoom range and simplicity. The short back focal length makes them particularly useful as zoom objectives in "viewfinder" (non-SLR) cameras.

Many lenses such as zoom lenses of the type described above utilize aspheric surfaces. These aspheric surfaces are generally sensitive to decentering and when decentered, usually introduce image plane tilt which is obviously undesirable. However, without these aspheric surfaces a lens system's performance will be compromised. Thus, there is a need for lenses, and particularly for zoom lenses, with reduced aspheric decenter sensitivity.

SUMMARY OF THE INVENTION

It is an object of the present invention to provide a lens system with an asphere element with the benefit of reduced aspheric decenter sensitivity, but without reducing the aberration correction or performance of the lens system.

The present invention provides a new and improved lens system such as a zoom lens system (or zoom lens) of the type described above with reduced aspheric decenter sensitivity.

According to the invention, this and other advantages are obtained by a zoom lens comprising two optical units of lens components including, from the object side, a first optical unit of positive power and a second optical unit of negative power and which zoom lens achieves zooming between a wide angle position and a narrow angle position by changing a distance between the first and the second optical units. The first optical unit includes two lens components and an aperture stop, a first lens component positioned on the object side of the first optical unit, the first lens component having at least one aspheric surface and a second positive lens component positioned on the image side of the first optical unit. The zoom lens includes a lens element having an aspheric surface i which is characterized by radius of curvature and by asphericity difference $\Delta$ such that $$T_i \leq 0.4 \text{ mm}$$

where $T_i$ is the total image tilt of the zoom lens produced by decentering of the aspheric surface i by 0.01 mm and is measured at ¾ of the field, whereby the zoom lens has reduced aspheric decenter sensitivity.

A lens element for use in a lens system comprising a body of optically transparent material having an index of refraction of at least 1.45, a front surface and rear surface on opposite sides thereof; at least one of said surfaces being an aspheric surface, said aspheric surface having reduced decenter sensitivity, said surface characterized by refractive power and asphericity difference $\Delta_i$, so that $$T_i \leq 0.25 \text{ mm},$$

where $T_i$ is the total image tilt produced by decentering of the aspheric surface i by 0.01 mm and is measured at about ¾ of the field, whereby said zoom lens has reduced aspheric decenter sensitivity.

With this invention, well corrected zoom lenses with reduced aspheric decenter sensitivity are obtained using as few as four lens elements.

BRIEF DESCRIPTION OF THE DRAWINGS

In the detailed description of the preferred embodiment of the invention presented below, reference is made to the accompanying drawing in which.

DESCRIPTION OF THE PREFERRED EMBODIMENT

Figure 1:
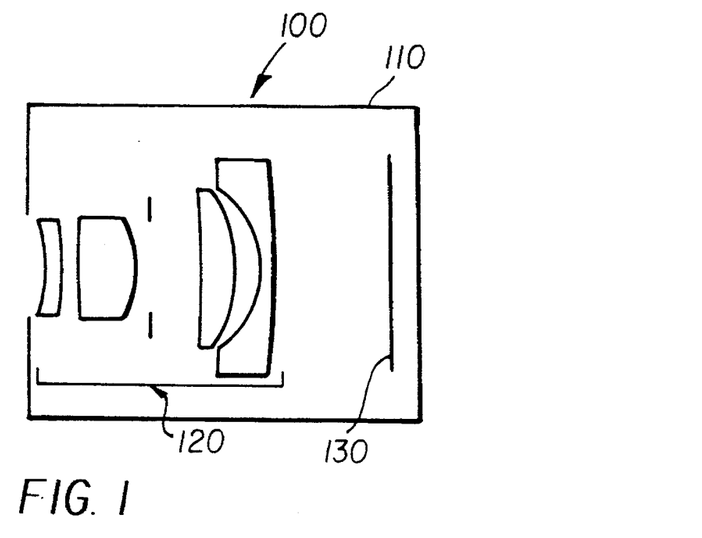
FIG. 1 is a simplified schematic side section of a photographic camera 100 including a zoom lens system 120.

Referring to FIG. 1, there is shown a camera 100 including a zoom lens 120. The camera 100 includes a camera housing 110 in which photographic film 130 is supported in a suitable location so that an image is produced by the zoom lens on the film. Camera 100 includes other known structures or means for advancing the film and a shutter for enabling an exposure of the film to capture an image of a scene to be photographed.

Figure 2:
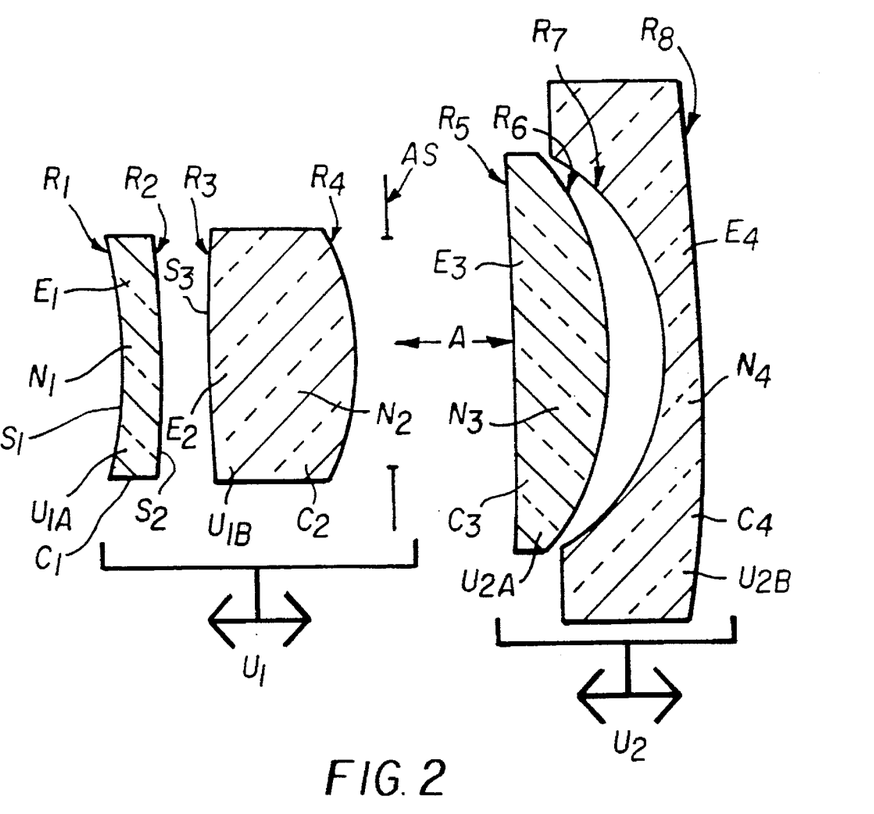
FIG. 2 is a schematic cross-sectional view of a zoom lens constructed according to a first preferred embodiment of the present invention.

The first preferred embodiment of the invention is shown in FIG. 2 and is illustrated by an example set forth in Table 1. In the drawing, the surfaces R are numbered by subscripts from the front or object side of the lens to the rear or image side of the lens. The thickness of the lens elements and the spacings between elements, including the zooming space A, are also located from front to rear (i.e., object to image). In the tables, surfaces and thicknesses are listed on the same line as the surface preceding the thickness or spacing as the case may be. All indexes N are for the green mercury e line of the spectrum at a wavelength $\lambda_e$ of 5461 Å. V is the Abbe number of the lens elements. EF is the effective focal length of the zoom lens, BF is its back focus and FF is the front focal distance, N.P. stands for the and X.P. for the exit pupil.

Figure 3:
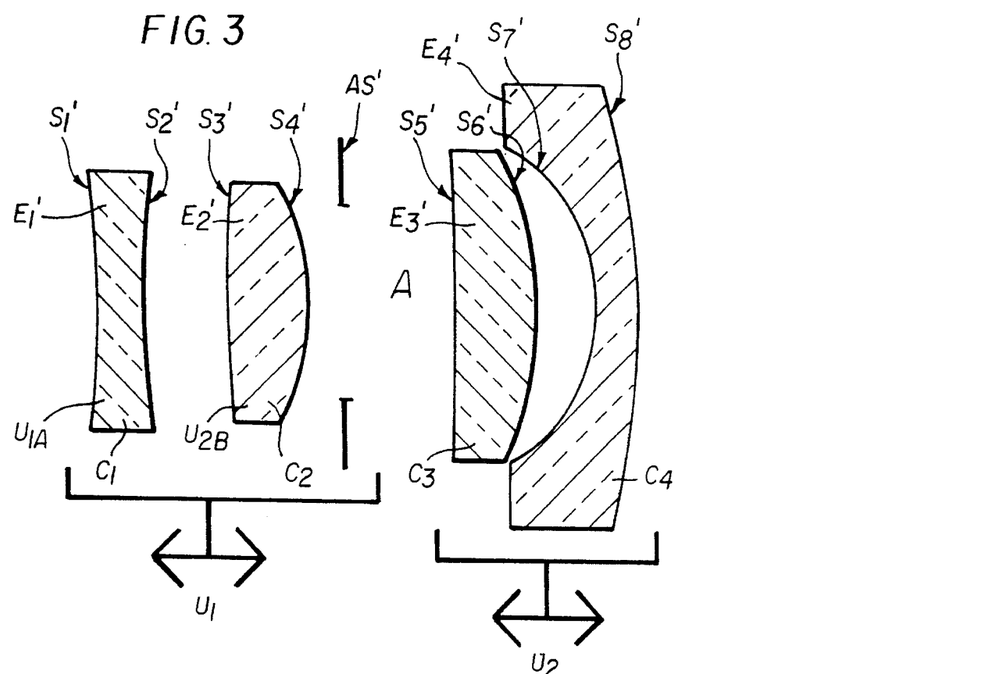
FIG. 3 is a schematic cross-sectional view of a zoom lens constructed according to a second preferred embodiment of the present invention.
Figure 4:
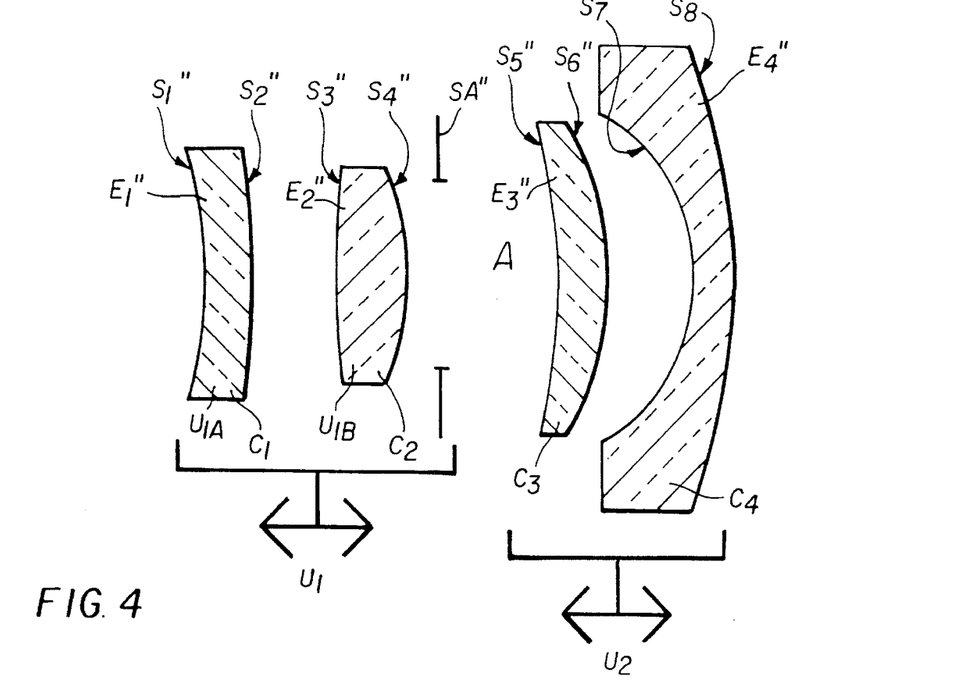
FIG. 4 is a schematic cross-sectional view of a zoom lens constructed according to a third preferred embodiment of the present invention.

All of the examples contain two optical units, specified as $U_1$ and $U_2$ in the drawing. Subunits $U_{1A}$ and $U_{1B}$ make up the first optical unit $U_1$. $U_2$ is the second optical unit.

Optical subunit $U_{1A}$ of the first preferred embodiment illustrated in FIG. 2 is a single lens component. It is preferred that this lens component be weak. By "weak" it is meant that the absolute value of the power of a first subunit $U_{1A}$ is smaller than the power of the first optical unit $U_1$ and also smaller than the power of the zoom lens in the wide angle mode, so that the absolute value of the ratio of power, $K_{1A}$, of the optical subunit $U_{1A}$ to the power, $K_{1W}$, of the zoom lens system in its wide angle mode is about 0.6 or less $$\left|\frac{K_{1A}}{K_{1W}}\right| < 0.6.$$

In this embodiment, this ratio is 0.56. It should also be noted that in this embodiment, the power of the single lens component comprising $C_1$ the subunit $U_{1A}$ is negative. This lens component $C_1$ is a single meniscus lens element $E_1$ that has its concave surface oriented towards the object space. It is preferred that element $E_1$ (the frontmost lens element) has one, and more preferably two, aspheric surfaces. The placement of aspheric surfaces on the front lens element greatly helps in the reduction of optical aberrations. In this embodiment, both surfaces of lens element $E_1$ are aspheric.

The second lens subunit $U_{1B}$, is positive. It is contemplated that it may contain one or more lens elements. In this embodiment, it is a single positive lens element $E_2$ which is biconvex.

It is preferred that the ratio of the focal length $f_{1B}$ of the second lens component $U_{1B}$ to the focal length $f_{1A}$ of the first lens component $U_{1A}$ be about equal to or less than 0.4. That is $$\left|\frac{f_{1B}}{f_{1A}}\right| = \left|\frac{K_{1A}}{K_{1B}}\right| \leq 0.4$$

where $K_{1A}$ is the power of the first optical component $U_{1A}$ and $K_{1B}$ is the power of the second optical component $U_{1B}$. It is even more preferable that this ratio it be less than 0.35. In this embodiment $$\left|\frac{K_{1A}}{K_{1B}}\right| = 0.32.$$

It should be noted that the stronger the front lens element, the more sensitive the optical system would be to the decenter of this lens element. That is, if the lens component $U_{1A}$ (or the lens element $E_1$) does not satisfy the above power ratio inequalities the zoom lens 120 is more likely to become sensitive to tilt or decenter. Additional conditions for minimizing aspheric decenter sensitivity will be discussed further down in the specification.

The index of refraction $N_1$ of the first lens element $E_1$ can be equal to or greater than 1.65. The index of refraction $N_2$ of the second lens element $E_2$ can be equal to or greater than 1.52. Despite the fact that the indices of the first two lens elements are larger than 1.65 and 1.52, we do not have a petzval problem or large astigmatism often associated with this type of lens system.

The aperture stop AS is positioned behind the second subunit. In this embodiment, it is located behind the lens element $E_2$.

The second optical unit $U_2$, in all of the examples, is substantially negative in power. Its movement provides most of the change in focal length of the lens during zooming. The second optical unit $U_2$ includes only one negative lens element. Also may include a positive lens element. In the embodiments described herein, optical unit $U_2$ includes a first positive lens subunit corresponding to a lens component $C_3$ or to lens elements $E_3$, $E_{3'}$, $E_{3''}$ and a second negative subunit $U_{2b}$ corresponding to lens component $C_4$ or to lens elements $E_4$, $E_{4'}$, $E_{4''}$. Therefore, in this embodiment and other embodiments, each of the lens components is a singlet. However, it is contemplated that the second optical unit $U_2$ may consist of a single negative lens element or, alternatively, of a front negative and a rear positive lens element.

The negative power of the front lens element $E_1$ helps create an inverted telephoto effect of the front positive group. This effect creates more space between the two zooming groups (or optical units) $U_1$ and $U_2$ and helps to expand a zooming range to 3× or more. The overall zoom lens system of the preferred embodiment tends toward a telephoto-type system which facilitates net compactness.

Furthermore, when eW is defined as the nodal point separation when the zoom lens operates at the wide angle position and when eT is defined as the nodal point separation when the zoom lens operates at the telephoto position, the preferred value for the ratio eW/eT is about equal to or less than 1.7. This value for eW/eT helps to maintain the large zoom ratio such as 3×, for example. If this ratio is allowed to become significantly larger than 1.7, the airspace A becomes too small to achieve the large zoom range and, in addition, the location of the aperture stop AS and the location of the third lens component $U_{2A}$ interfere with each other.

Note that the zoom lens of the preferred embodiment is corrected across a zoom range of 3× with an effective aperture that varies from approximately F/6.3 to F/9.3. This range of relative apertures for a 3× four element zoom lens suitable as an objective or taking lens for a 35 mm camera is quite remarkable.

Table 1 provides specific parameters for the preferred embodiment illustrated in FIG. 1. The accompanying notes 1–3 provide further parameters as well as MTF values for the zoom lens of the preferred embodiment.

TABLE 1

| SURF. | CLEAR APER. | AXIAL BEAM | RADIUS | THICKNESS | N | V |
|---|---|---|---|---|---|---|
| 1 | 9.52 | 8.33 | ASPHERE | 1.660 | | |
| 2 | 8.80* | 8.75 | ASPHERE | 1.736 | | |
| 3 | 9.37 | 9.37 | 66.4470 | 5.892 | 1.552 | 63.5 |
| 4 | 9.98 | 9.97 | −10.5410 | 1.327 | | |
| | 8.90 | 8.90 | DIAPHRAGM | A | | |
| 5 | 14.79 | 8.25 | ASPHERE | 3.517 | 1.590 | 30.9 |
| 6 | 15.61 | 7.55 | ASPHERE | 2.412 | | |

TABLE 1-continued

| 7 | 15.50  | 5.91 | −8.99500 |       | 1.254 | 1.804 | 39.6 |
|---|--------|------|----------|-------|-------|-------|------|
| 8 | 21.22* | 5.85 | −99.5818 |       |       |       |      |

*DO NOT EXCEED

| EF | BF | FF | BEST FOCUS | A | N.P. LOC. | N.P. DIAM. | X.P. LOC. | X.P. DIAM. |
|---|---|---|---|---|---|---|---|---|
| 28.97 | 7.99  | 43.43 | −.09 | 10.567 | 6.74 | 4.28 | −8.74 | 2.47 |
| 47.47 | 25.63 | 62.83 | −.50 | 5.048  | 6.74 | 6.07 | −6.75 | 4.14 |
| 77.49 | 54.27 | 94.30 | +.11 | 1.700  | 6.74 | 8.50 | 5.16  | 6.52 |

| EF | LENS LENGTH | STOP DIAM. | REL. APER. | REL. ILLUM. | COVERAGE (Half Angle) |
|---|---|---|---|---|---|
| 28.97 | 28.365 | 4.48 | 6.80 | .24 | 36.6° |
| 47.47 | 22.846 | 6.35 | 7.90 | .47 | 24.3° |
| 77.49 | 19.498 | 8.90 | 9.30 | .68 | 15.6° |

NOTES:
1.
ASPHERIC EQUATION:

$$X = \frac{CY^2}{1 + \sqrt{1 - (k+1)C^2Y^2}} + DY^4 + EY^6 + FY^8 + GY^{10}$$

| SURF. 1 | C = | −0.0509762 | D = | −0.2141500E−03 | E = | 0.1045400E−04 |
|---|---|---|---|---|---|---|
|   | k = | 0.0000000  | F = | −0.3043000E−06 | G = | 0.4268700E−08 |
| SURF. 2 | C = | −0.0274527 | D = | −0.4458200E−04 | E = | 0.1198700E−04 |
|   | k = | 0.0000000  | F = | −0.3061900E−06 | G = | 0.5166000E−08 |
| SURF. 5 | C = | −0.0136101 | D = | 0.1921700E−04  | E = | 0.3149300E−06 |
|   | k = | 0.0000000  | F = | 0.7225300E−08  | G = | −0.1619300E−09 |
| SURF. 6 | D = | −0.0580744 | D = | 0.0000000E+00  | E = | 0.0000000E+00 |
|   | k = | 3.0955000  | F = | 0.0000000E+00  | G = | 0.0000000E+00 |

2.

| SURFACES | EF | BF | FF |
|---|---|---|---|
| 1–4 | 20.74  | 23.04  | 13.06  |
| 5–8 | −19.78 | −19.65 | −25.30 |

3.
MTF DATA AT BEST FOCUS USING WAVELENGTHS 546.1, 486.1, AND 656.3 WITH RESPECTIVE WEIGHTS .5, .15, .35:

-PER CENT FIELD- (SAGITTAL/TANGENTIAL)

| EF | L/MM | AXIS | 40% | 60% | 75% | 90% | AWA |
|---|---|---|---|---|---|---|---|
| 28.97 | 20 | 77 | 71/51 | 74/59 | 80/70 | 30/28 | 65.2 |
| 28.97 | 5  | 96 | 96/93 | 96/93 | 97/94 | 91/85 | 94.4 |
| 47.47 | 20 | 76 | 71/57 | 72/51 | 76/70 | 66/32 | 65.3 |
| 47.47 | 5  | 96 | 96/93 | 96/92 | 96/95 | 95/88 | 94.5 |
| 77.49 | 20 | 70 | 64/63 | 62/65 | 59/58 | 51/28 | 61.6 |
| 77.49 | 5  | 95 | 94/94 | 93/94 | 93/93 | 90/87 | 93.3 |

According to the invention, zoom lenses such as the ones described in preferred embodiments have a very important property, i.e., they can be manufactured with relative ease. For example, in the first embodiment, the sensitivity to aspheric decentering has been reduced to a tolerable level with the desired result that the centering of the elements $E_2$ and $E_4$ can be achieved by normal manufacturing assembly without micro-manipulating the elements in their mount. Decenter sensitivity needs to be reduced because decentering a sensitive lens element with an aspheric surface(s) or decentering of an aspherical surface introduces image plane tilt (along with other aberrations) which is obviously very undesirable.

Figure 6:
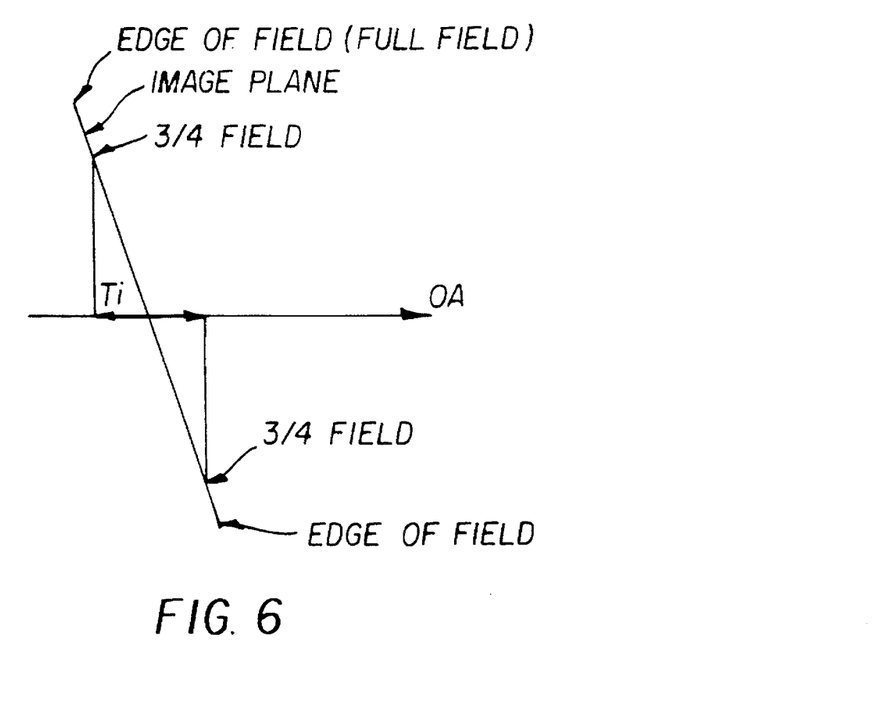
FIG. 6 is a schematic showing how to measure an image plane tilt $T_i$ introduced by the decenter of an aspheric surface i.

As illustrated in FIG. 6, an image plane tilt T can be measured as a distance along the optical axis OA from the bottom of the image to the top of the image at the ¾ field height (75% of the field). If there is no image plane tilt, this distance is zero. It should be noted that field coverage can vary with lens focal length and application. For our purposes, the extremes of the zoom range are investigated for tilt sensitivity. It has been found that the telephoto mode usually defines maximum sensitivity. It is therefore apparent that reduced zoom ranges and coverages will favorably affect the capability of the lens to exhibit reduced sensitivity. The image plane tilt Ti is calculated by decentering the aspheric surface i by 0.01 mm and by measuring or calculating the effects of such decenter. The value of the image plane tilt Ti introduced by decentering the first and the second surfaces of the frontmost lens element $E_1$, $E_{1'}$ and $E_{1''}$ of each of the three embodiments are provided in Table 4.

This preferred embodiment incorporates four aspheric surfaces on two elements to achieve the large focal length range and maintain the required high image quality. These aspheres exhibit special characteristics that make them unique to the manufacturing process. They have greatly reduced decenter sensitivity. The first element $E_1$ is a negative meniscus biosphere with the surfaces bent away from the image plane. It was found that sensitivity of the first surface, which is an aspheric surface (of the first lens elements $E_1$) to aberrations such as spherical aberration, astigmatism and coma, is reduced when $|DH^3|$ is greater than 16, where D is the fourth order aspheric coefficient and H is the size of the image diagonal covered by the lens.

Figure 5:
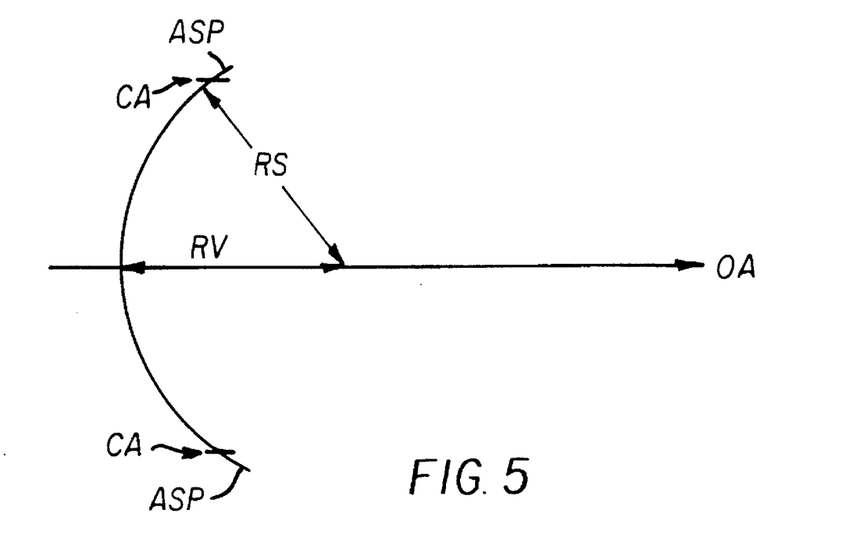
FIG. 5 is a schematic showing how to measure an amount of aspheric difference $\Delta$ on a surface of a lens element of a zoom lens illustrated on FIGS. 2, 3, or 4.

Alternatively, or in addition, in order to reduce aspheric decenter sensitivity, the designer's goal is to reduce the amount of asphericity difference $\Delta$ from best fit sphere to the most minimal value without compromising the image quality, hence not realizing the full potential of the aspheric surface. If the asphericity difference $\Delta$ is not minimized, decentering the sensitive aspheric lens element is likely to create a large amount of image plane tilt. As shown in FIG. 5, we define the radius (RS) of the best fit sphere by constructing a perpendicular to the slope of the aspheric surface ASP at the clear aperture CA. The numerical value for RS is computed by measuring the distance to the point where that perpendicular intersects the optical axis OA. The distance from that point to the vertex of the aspheric surface (RV) is then measured. We let $\Delta$ be the measurement of asphericity difference.

$$\Delta = (|RV| - |RS|)/\lambda$$

where $\lambda$ is the wavelength of the light used to measure this difference (usually $\lambda=0.00066$ mm), can be used to measure the amount of aspheric departure from a best fit sphere. (Care must be taken not to allow inflection points and gross differences at smaller apertures.) Generally, increasing $\Delta$ increased the surface contribution to various aberrations and their control. As $\Delta$ becomes smaller, the aspheric surface is less sensitive to image plane tilt. Hence, the lens component or lens element decenter will produce smaller tilt of the image plane. It is preferred that $\Delta_1$ for surface $S_1$ of the element $E_1$ be <50 waves; $\Delta_2$ for surface $S_2$ (image side surface) for the lens element $E_1$ be <250 waves. It is also preferred that if the front surface of the third lens element $E_3$ is to be less sensitive to decenter, the asphericity difference $\Delta_3$ for front surface of element $E_3$ be <100 waves. With this definition, the amount of waves of departure for the first lens element $E_1$, surfaces $S_1$ and $S_2$ are less than 20 waves and 130 waves, respectively. And at the first surface of the third lens component the asphericity difference $\Delta_3$ is less than 41 waves. Obviously, if the aspheric surfaces were reduced to spherical surfaces, the differences would be zero, but the benefit of aspheric profile for correcting lens aberrations will be lost as well. However, given the large asphericity of surface $S_2$ of the first lens element $E_1$, the sensitivity to decenters of this surface is about equal to the sensitivity of surface $S_1$ of this element. Specifically, the image plane tilt Ti introduced by the decenter of the front surface $S_1$ and the rear surface $S_2$ of the lens element $E_1$ is 0.18 and 0.19, respectively. More importantly, when these surfaces are modeled for aspheric decentering sensitivity, they are found to be within normal manufacturing capabilities. It is preferred that the lens element $E_i$ be weak and that the refractive power of a lens element's aspheric surface and the asphericity difference $\Delta_i$ be such that Ti to be less than 0.40 mm. It is more preferred that Ti be less than 0.30 mm. It is even more preferable that Ti be about equal or less than 0.25 mm. It is most preferable that Ti be about equal or less than 0.2 mm.

Thus, by reducing asphericity difference $\Delta$, especially on the front surface of the frontmost lens element $E_1$, we get a benefit of reduced decenter sensitivity without reducing the performance of the lens system.

FIG. 3 illustrates a zoom lens according to a second preferred embodiment of the present invention. Its parameters are provided in Table 2. The zoom lens of the second embodiment is similar to that of the first embodiment, but it provides a 2× zooming range. The F-number range is F/4.65 to F/6.91.

The zoom lens system of the second embodiment comprises a negative lens element, $E_1'$; a positive lens element, $E_2'$; an aperture stop AS'; a third lens element, $E_3'$; and a fourth lens element, $E_4'$. The lens element $E_1'$ is a biconcave lens element having a front (i.e., object side) concave surface $S_1'$ and a rear (i.e., image side) concave surface $S_2'$. Both surfaces are aspheric. The positive lens element $E_2'$ is a biconvex lens element having an object side surface $S_3'$ and the image side surface $S_4'$. An aperture stop AS' is located behind the second lens element $E_2'$. The first and the second lens elements $E_1'$ and $E_2'$ comprise the first optical unit U1. The aperture stop AS' moves together with elements $E_1'$ and $E_2'$ during zooming. The third lens element $E_3'$ has a front surface $S_5'$ which is aspheric and a rear convex surface $S_6'$. The fourth element $E_4'$ is a negative meniscus lens element having a concave front (i.e. object side) surface $S_7'$ and a convex rear (i.e. image side) surface $S_8'$.

As stated above, the front-most lens element $E_1'$ is a biconcave lens element with a bi-asphere—i.e. each of the surfaces of this lens element is an aspheric surface.

The biconcave shape of the lens element $E_1'$ also facilitates the reduction of the aspheric centering sensitivity. The aspheric sensitivity of the lens element depends both on the power of the lens element and on the amount of the asphericity involved (i.e. the amount of departure from the best fit sphere). The less powerful the lens surface, the less sensitive it is to decenter. As the lens element's surface becomes more powerful, the more it exaggerates or contributes to the aspheric decenter sensitivity that is present due to an aspheric profile. Similarly, if the amount of asphericity becomes small, the lens element becomes more sensitive to decenter. Thus, in the zoom lens of the second embodiment, the power of the lens surfaces was distributed among the front and the rear surface so that the first lens element became biconcave thereby reducing the aspheric decenter sensitivity while providing the front lens unit $U_1$ with the required amount of negative power contribution. Unlike most other prior art designs of this style, i.e. the designs having a front positive and a rear negative optical unit, when this zoom lens operates in a long focal length position it can be defined as a true telephoto system. The telephoto ratio including the best focus position is 1.05. The ratio of the nodal points separation of the wide angle zoom position to the telephoto zoom position is 1.41. In this embodiment, the ratio:

$$\left| \frac{K_{1A}}{K_{1W}} \right| = \frac{1}{1.39} = 0.719$$

and the ratio:

$$\left| \frac{K_{1A}}{K_{1B}} \right| = \frac{1}{2.78} = 0.358.$$

As can be seen from Table 2, this zoom lens has three aspheric surfaces—two on the front lens element and one on an object side surface of the third lens element. The asphericity difference $\Delta_1'$ for the front surface (object side surface) of the lens element $E_1'$ is 250 waves. The asphericity difference $\Delta_2'$ for the rear surface (image side surface) of the element $E_1'$ is 190. The third lens element $E_3$ was not optimized for aspheric sensitivity. The asphericity difference $\Delta_3'$ of the front surface (object side surface) of the third lens element $E_3'$ is 513 waves.

Although the biconcave shape of the element $E_1'$ distributes the negative power of the lens element among the two surfaces and thus reduces the decenter sensitivity, (a) because the asphericity difference $\Delta_1'$ for the front surface of the first lens element $E_1'$ is larger than that $\Delta_1$ of the lens elements $E_1$ of the first embodiment and (b) because the element $E_{1'}$ is somewhat stronger than the lens element $E_1$, the result is that the lens element $E_{1'}$ of the second embodiment is more sensitive to decentration than the lens element $E_1$ of the first embodiment. More specifically, the value for the image plane tilt $T_{1'}$ introduced by the front surface $S_{1'}$ of the lens element $E_{1'}$ is 0.4 mm and the value of the image plane tilt $T_{2'}$ introduced by the rear surface $S_{2'}$ of the lens element $E_{1'}$ is 0.21 mm.

FIG. 4 illustrates a zoom lens system according to a third preferred embodiment of the invention. This zoom lens provides a 2× zooming range and F-number range of F/5.8 to F/7.0. It is similar to the above two embodiments in its overall configuration. This zoom lens comprises a first, negative power lens element $E_1''$; a second, positive power lens element $E_2''$; an aperture stop AS''; a third lens element $E_3''$; and a fourth lens element $E_4''$. The lens element $E_1''$ is a meniscus lens element having a concave object side

TABLE 2

| SURF | CLEAR APER. | AXIAL BEAM | RADIUS | THICKNESS | N | Y |
|---|---|---|---|---|---|---|
| 1 | 9.30* | 6.74 | ASPHERE | 1.850 | | |
| 2 | 8.60 | 6.84 | ASPHERE | 3.042 | | |
| 3 | 8.36 | 7.85 | 35.2790 | 3.025 | 1.603 | 60.6 |
| 4 | 8.10* | 8.07 | −9.18850 | 1.250 | | |
| | 7.13 | 7.13 | DIAPHRAGM | A | | |
| 5 | 10.81* | 6.24 | ASPHERE | 2.945 | 1.492 | 54.7 |
| 6 | 11.52 | 5.54 | −14.2014 | 2.317 | | |
| 7 | 11.57 | 4.16 | −6.76620 | 1.648 | 1.788 | 47.5 |
| 8 | 16.34* | 4.11 | −31.9220 | | | |

*DO NOT EXCEED

| EF | BF | FF | BEST FOCUS | A | N.P. LOC. | N.P. DIAM. | X.P. LOC. | X.P. DIAM. |
|---|---|---|---|---|---|---|---|---|
| 24.70 | 7.47 | 34.87 | −.16 | 6.775 | 6.43 | 5.39 | −7.31 | 3.22 |
| 33.87 | 16.23 | 44.45 | −.30 | 4.112 | 6.43 | 6.16 | −6.31 | 4.10 |
| 46.56 | 28.36 | 57.72 | −.39 | 2.155 | 6.43 | 6.91 | −5.43 | 5.01 |

| EF | LENS LENGTH | STOP DIAM. | COVERAGE (Half Angle) |
|---|---|---|---|
| 24.70 | 22.852 | 5.56 | 34.4° |
| 33.87 | 20.189 | 6.36 | 26.8° |
| 46.56 | 18.232 | 7.13 | 20.4° |

NOTES:
1.
ASPHERIC EQUATION:

$$X = \frac{CY^2}{1 + \sqrt{1 - (k+1)C^2Y^2}} + DY^4 + EY^6 + FY^8 + GY^{10}$$

| SURF. 1 | C = | −0.0020000 | D = | −0.3436000E−03 | E = | 0.5803000E−05 |
|---|---|---|---|---|---|---|
| | k = | 0.0000000 | F = | −0.2857000E−06 | G = | 0.3927000E−08 |
| SURF. 2 | C = | 0.0321331 | D = | −0.2297900E−04 | E = | 0.1465400E−04 |
| | k = | 0.0000000 | F = | −0.4436600E−06 | G = | 0.1141100E−07 |
| SURF. 5 | C = | −0.0271738 | D = | 0.1955500E−03 | E = | 0.9592300E−06 |
| | k = | −31.5475000 | F = | 0.1136000E−06 | G = | 0.0000000E+00 |

2.

| SURFACES | EF | BF | FF |
|---|---|---|---|
| 1–4 | 15.947 | 17.703 | 9.028 |
| 5–8 | −15.248 | −16.152 | −19.521 |

3.
MTF DATA AT BEST FOCUS USING WAVELENGTHS 546.1, 486.1, AND 656.3 WITH RESPECTIVE WEIGHTS .5, .15, .35:

| | | | -PERCENT FIELD- (SAGITTAL/TANGENTIAL) | | | | |
|---|---|---|---|---|---|---|---|
| EF | L/MM | AXIS | 40% | 60% | 75% | 90% | AWA |
| 24.70 | 22 | 83 | 77/65 | 78/74 | 80/67 | 61/51 | 73.7 |
| 24.70 | 7 | 96 | 95/93 | 95/94 | 96/92 | 93/85 | 94.2 |
| 33.87 | 22 | 87 | 85/77 | 79/63 | 72/58 | 56/45 | 73.0 |
| 33.87 | 7 | 97 | 96/95 | 95/91 | 93/90 | 89/85 | 93.2 |
| 46.56 | 22 | 81 | 75/67 | 75/64 | 75/68 | 67/63 | 71.8 |
| 46.56 | 7 | 95 | 94/93 | 94/92 | 94/93 | 92/91 | 93.4 |

4.
SURFACES 6 AND 7 EDGE CONTACT AT A DIAMETER OF 12.011.

surface $S_1"'$; and a convex image side surface $S_2"'$. Both surfaces $S_1"'$ and $S_2"'$ are aspheric. The asphericity difference $\Delta_1"'$ for the front surface (i.e., an object side surface) $S_1"'$ of the lens element $E_1"'$ is 21 waves. The asphericity difference $\Delta_2"'$ for the rear surface $S_2"'$ of this lens element is 158 waves. Because the asphericity differences are within the ranges discussed in the first preferred embodiment, the zoom lens of the third preferred embodiment has a significantly reduced aspheric decenter sensitivity. That is, we are able to get a good aberration correction despite the fact that s the aspheric profile of the front lens element $E_1"'$ is weakened (i.e., despite the fact that $\Delta_i$ is minimized, provided the front lens element $E_1"'$ has two aspheres and $\Delta_1"'<\Delta_2"'$.

The second lens element $E_2"$ is a biconvex lens element having an object side surface $S_3"$ and an image side surface $S_4"$. The front and the second lens element $E_1"$ and $E_2"$ comprise the first optical unit. An aperture stop AS" is located behind the second element $E_2"$ and in front of a third lens element $E_3"$. The third lens element $E_3"$ has a front lens surface $S_5"$ and a rear lens surface $S_6"$. Both surfaces are aspheric. The third lens element $E_3"$ is a meniscus lens element. It is also bi-aspheric. The fourth lens element $E_4"$ is a negative meniscus lens element having a concave surface $S_7"$ oriented towards the object side and a convex surface $S_8"$ facing the image surface. In this embodiment, the ratio:

$$\left|\frac{K_{1A}}{K_{1W}}\right|=0.433$$

and the ratio:

$$\left|\frac{K_{1A}}{K_{1B}}\right|=0.258.$$

Thus, the front lens element $E_1"'$ of the third embodiment is relatively weaker than the front lens element $E_1'$ of the second embodiment. The value of the image plane tilt Ti introduced by decentering surfaces $S_1"'$ and $S_2"'$ is 0.09 mm and 0.21 mm, respectively. Therefore, the zoom lens of the third preferred embodiment is less sensitive to the first element decenter than the zoom lens of the second embodiment.

TABLE 3

| SURF. | CLEAR APER. | AXIAL BEAM | RADIUS | THICKNESS | INDEX | V NUMBER |
|---|---|---|---|---|---|---|
| 1 | 9.39 | 6.65 | ASPHERE | 1.850 | 1.844 | 23.8 |
| 2 | 8.68* | 7.00 | ASPHERE | 3.133 | | |
| 3 | 8.09 | 7.67 | 32.7899 | 2.647 | 1.558 | 67.3 |
| 4 | 7.78* | 7.73 | −10.6844 | 1.250 | | |
| | 6.94 | 6.94 | DIAPHRAGM | A | | |
| 5 | 10.98 | 6.20 | ASPHERE | 1.760 | 1.492 | 57.4 |
| 6 | 11.65 | 5.96 | ASPHERE | 3.342 | | |
| 7 | 12.31 | 4.26 | −7.13250 | 1.600 | 1.720 | 50.4 |
| 8 | 17.29* | 4.24 | −23.6368 | | | |

*DO NOT EXCEED

| EF | BF | FF | BEST FOCUS | A | N.P. LOC. | N.P. DIAM. | X.P. LOC. | X.P. DIAM. |
|---|---|---|---|---|---|---|---|---|
| 24.71 | 6.61 | 33.94 | −.15 | 7.997 | 6.23 | 4.29 | −8.59 | 2.64 |
| 33.90 | 16.29 | 42.67 | −.31 | 4.621 | 6.23 | 5.45 | −7.21 | 3.78 |
| 46.55 | 29.62 | 54.68 | −.33 | 2.155 | 6.23 | 6.79 | −5.96 | 5.19 |

| EE | LENS LENGTH | STOP DIAM. | REL. APER. | REL. ILLUM. | COVERAGE (Half Angle) |
|---|---|---|---|---|---|
| 24.71 | 23.579 | 4.39 | 5.80 | .28 | 34.4° |
| 33.90 | 20.203 | 5.57 | 6.30 | .46 | 26.8° |
| 46.55 | 17.737 | 6.94 | 7.00 | .64 | 20.4° |

NOTES:
1.
ASPHERIC EQUATION:

$$X = \frac{CY^2}{1+\sqrt{1-(k+1)C^2Y^2}} + DY^4 + EY^6 + FY^8 + GY^{10}$$

| SURF. 1 | C = | −0.0492703 | D = | −0.3040600E−03 | E = | 0.9971600E−05 |
|---|---|---|---|---|---|---|
| | k = | 0.0000000 | F = | −0.1381400E−06 | G = | 0.7208600E−09 |
| SURF. 2 | C = | −0.0275661 | D = | −0.8117900E−04 | E = | 0.1064000E−04 |
| | k = | 0.0000000 | F = | 0.1634200E−07 | G = | −0.2548200E−08 |
| SURF. 5 | C = | −0.0664792 | D = | −0.2195700E−03 | E = | 0.9818500E−05 |
| | k = | −14.5410000 | F = | −0.3945900E−07 | G = | 0.0000000E+00 |
| SURF. 6 | D = | −0.0884337 | D = | 0.0000000E+00 | E = | 0.0000000E+00 |
| | k = | −1.4610000 | F = | 0.0000000E+00 | G = | 0.0000000E+00 |

2.

| SURFACES | EF | BF | FF |
|---|---|---|---|
| 1–4 | 17.087 | 18.707 | 10.494 |
| 5–8 | −18.003 | −19.426 | −21.910 |

TABLE 3-continued

3.
MTF DATA AT BEST FOCUS USING WAVELENGTHS 546.1, 486.1,
AND 656.3 WITH RESPECTIVE WEIGHTS .5, .15, .35:

| | | | -PER CENT FIELD- (SAGITTAL/TANGENTIAL) | | | | |
|---|---|---|---|---|---|---|---|
| EF | L/MM | AXIS | 40% | 60% | 75% | 90% | AWA |
| 24.70 | 22 | 79 | 78/71 | 77/79 | 80/73 | 77/64 | 76.5 |
| 24.70 | 7 | 95 | 95/94 | 95/95 | 95/92 | 95/89 | 94.3 |
| 33.87 | 22 | 74 | 77/77 | 77/71 | 75/58 | 67/34 | 71.7 |
| 33.87 | 7 | 95 | 95/95 | 95/93 | 94/90 | 93/82 | 93.4 |
| 46.56 | 22 | 85 | 81/74 | 82/74 | 83/76 | 79/62 | 78.5 |
| 46.56 | 7 | 96 | 95/94 | 95/94 | 95/93 | 94/90 | 94.3 |

Table 4 compares the tilt sensitivity Ti of the zoom lenses of the above-described preferred embodiments.

TABLE 4

| | Image Plane Tilt |
|---|---|
| 1st embodiment | $T_1 = 0.18; T_2 = 0.19$ |
| 2nd embodiment | $T_1' = 0.4; T_2' = 0.21$ |
| 3rd embodiment | $T_1'' = 0.09; T_2'' = 0.21$, |

This invention has been described in detail with particular reference to a preferred embodiment thereof, but it will be understood that variations and modifications can be effected within the spirit and scope of the invention as described hereinabove and as defined in the appended claims. For example, the single lens element forming subunit $U_{1B}$ could be divided into two or more weaker components. Although such minor changes are within the scope of the invention, they would detract from its simplicity. Thus, a two lens element first unit is preferred. Similarly, a single front lens element can be divided into two very weak lens elements. A rear lens unit consisting of a single negative lens element or a front negative, rear positive lens elements combination is also contemplated by the inventor. Such changes are within the scope of the invention.

What is claimed is:

1. A zoom lens comprising two optical units of lens components, said optical units including, from an object side, a first optical unit of positive power and a second optical unit of negative power and which zoom lens achieves zooming between a wide angle position and a narrow angle position by changing a distance between said first and said second optical units;

said first optical unit including (i) a first lens component positioned on the object side of said first optical unit, said first lens component having two aspheric surfaces, each of said aspheric surfaces is characterized by radius of curvature and by asphericity difference such that $Ti \leq 0.4$ mm, where Ti is a total image tilt of said zoom lens, produced by decentering each of said aspheric surfaces by 0.01 mm and is measured at ¾ of the field, whereby said zoom lens has reduced aspheric decenter sensitivity and wherein $\Delta_2 > \Delta_1$, where $\Delta_1$ is the asphericity difference of one surface of the first lens component and $\Delta_2$ is the asphericity difference of the other surface of the first lens component;

(ii) and a second, positive power lens component positioned behind said first lens component; and (iii) an aperture stop.

2. A zoom lens according to claim 1, wherein said second optical unit consists of a front positive lens component and a second negative lens component.

3. A zoom lens according to claim 1, wherein said lens components are single lens elements.

4. A zoom lens according to claim 2, wherein said lens components are single lens elements.

5. A zoom lens according to claim 1 wherein the first lens component is a negative meniscus lens element.

6. A zoom lens according to claim 2 wherein the first lens component is a negative meniscus lens element.

7. A zoom lens according to claim 1, wherein said first lens component is a single lens element having two aspheric surfaces.

8. A zoom lens according to claim 2, wherein said first lens component is a single element having two aspheric surfaces.

9. A zoom lens according to claim 1 having at least three aspheric surfaces.

10. A zoom lens according to claim 2 having at least three aspheric surfaces.

11. A zoom lens according to claim 3 having at least three aspheric surfaces.

12. A zoom lens according to claim 4, having at least three aspheric surfaces.

13. A zoom lens according to claim 1 wherein $\Delta_1$ is the asphericity difference of the object side surface of the first lens component.

14. A zoom lens according to claim 1 wherein:

$\Delta_1 < 50$ waves $\Delta_2 < 250$ waves.

15. A zoom lens according to claim 2 wherein:

$\Delta_1 < 50$ waves $\Delta_2 < 250$ waves.

16. A zoom lens according to claim 3 wherein:

$\Delta_1 < 50$ waves $\Delta_2 < 250$ waves.

17. A zoom lens according to claim 4 wherein:

$\Delta_1 < 50$ waves $\Delta_2 < 250$ waves where $\Delta_1$ is the asphericity difference of the object side surface of the first lens component and $\Delta_2$ is the asphericity difference of the image side surface of the first lens component.

18. A zoom lens according to claim 9 wherein:

$\Delta_1 < 50$ waves $\Delta_2 < 250$ waves where $\Delta_1$ is the asphericity difference of the object side surface of the first lens component and $\Delta_2$ is the asphericity difference of the image side surface of the first lens component.

19. A zoom lens according to claim 2 having the following parameters:

| SURF. | RADIUS | THICKNESS | N | V |
|---|---|---|---|---|
| 1 | ASPHERE | 1.660 | | |
| 2 | ASPHERE | 1.736 | | |
| 3 | 66.4470 | 5.892 | 1.552 | 63.5 |
| 4 | −10.5410 | 1.327 | | |
|   | DIAPHRAGM | A | | |
| 5 | ASPHERE | 3.517 | 1.590 | 30.9 |
| 6 | ASPHERE | 2.412 | | |
| 7 | −8.99500 | 1.254 | 1.804 | 39.6 |
| 8 | −99.5818 | | | | where N is an index of refraction and V is an Abbe number.

ASPHERIC EQUATION:

$$X = \frac{CY^2}{1 + \sqrt{1 - (k+1)C^2Y^2}} + DY^4 + EY^6 + FY^8 + GY^{10}$$

SURF. 1  C = −0.0509762  D = −0.2141500E−03  E = 0.1045400E−04
         k = 0.0000000   F = −0.3043000E−06  G = 0.4268700E−08
SURF. 2  C = −0.0274527  D = −0.4458200E−04  E = 0.1198700E−04
         k = 0.0000000   F = −0.3061900E−06  G = 0.5166000E−08
SURF. 5  C = −0.0136101  D = 0.1921700E−04   E = 0.3149300E−06
         k = 0.0000000   F = 0.7225300E−08   G = −0.1619300E−09
SURF. 6  D = −0.0580744  D = 0.0000000E+00   E = 0.0000000E+00
         k = 3.0955000   F = 0.0000000E+00   G = 0.0000000E+00

20. A zoom lens according to claim 2 having the following parameters:

| SURF. | RADIUS | THICKNESS | N | V |
|---|---|---|---|---|
| 1 | ASPHERE | 1.850 | | |
| 2 | ASPHERE | 3.042 | | |
| 3 | 35.2790 | 3.025 | 1.603 | 60.6 |
| 4 | −9.18850 | 1.250 | | |
|   | DIAPHRAGM | A | | |
| 5 | ASPHERE | 2.945 | 1.492 | 54.7 |
| 6 | −14.2014 | 2.317 | | |
| 7 | −6.76620 | 1.648 | 1.788 | 47.5 |
| 8 | −31.9220 | | | | where N is an index of refraction and V is an Abbe number.

ASPHERIC EQUATION:

$$X = \frac{CY^2}{1 + \sqrt{1 - (k+1)C^2Y^2}} + DY^4 + EY^6 + FY^8 + GY^{10}$$

SURF. 1  C = −0.0020000   D = −0.3436000E−03  E = 0.5803000E−05
         k = 0.0000000    F = −0.2857000E−06  G = 0.3927000E−08
SURF. 2  C = 0.0321331    D = −0.2297900E−04  E = 0.1465400E−04
         k = 0.0000000    F = −0.4436600E−06  G = 0.1141100E−07
SURF. 5  C = −0.0271738   D = 0.1955500E−03   E = 0.9592300E−06
         k = −31.5475000  F = 0.1136000E−06   G = 0.0000000E+00

21. A zoom lens according to claim 2 having the following parameters:

| SURF | RADIUS | THICKNESS | INDEX | V NUMBER |
|---|---|---|---|---|
| 1 | ASPHERE | 1.850 | 1.844 | 23.8 |
| 2 | ASPHERE | 3.133 | | |
| 3 | 32.7899 | 2.647 | 1.558 | 67.3 |
| 4 | −10.6844 | 1.250 | | |
|   | DIAPHRAGM | A | | |
| 5 | ASPHERE | 1.760 | 1.492 | 57.4 |
| 6 | ASPHERE | 3.342 | | |
| 7 | −7.13250 | 1.600 | 1.720 | 50.4 |
| 8 | −23.6368 | | | | where N is an index of refraction and V is an Abbe number.

ASPHERIC EQUATION:
$$X = \frac{CY^2}{1 + \sqrt{1-(k+1)C^2Y^2}} + DY^4 + EY^6 + FY^8 + GY^{10}$$

| | | | | | | |
|---|---|---|---|---|---|---|
| SURF. 1 | C = | −0.0492703 | D = | −0.3040600E−03 | E = | 0.9971600E−05 |
| | k = | 0.0000000 | F = | −0.1381400E−06 | G = | 0.7208600E−09 |
| SURF. 2 | C = | −0.0275661 | D = | −0.8117900E−04 | E = | 0.1064000E−04 |
| | k = | 0.0000000 | F = | 0.1634200E−07 | G = | −0.2548200E−08 |
| SURF. 5 | C = | −0.0664792 | D = | −0.2195700E−03 | E = | 0.9818500E−05 |
| | k = | −14.5410000 | F = | −0.3945900E−07 | G = | 0.0000000E+00 |
| SURF. 6 | D = | −0.0884337 | D = | 0.0000000E+00 | E = | 0.0000000E+00 |
| | k = | −1.4610000 | F = | 0.0000000E+00 | G = | 0.0000000E+00 |

22. A lens element for use in a lens system comprising a body of optically transparent material having an index of refraction of at least 1.45, a front surface and rear surface on opposite sides thereof; both of said surfaces being aspheric surfaces, said aspheric surfaces having reduced decenter sensitivity, said aspheric surfaces characterized by refractive power and asphericity difference, so that $Ti \leq 0.25$ mm, where Ti is the total image tilt of said lens system, produced by decentering either one of said aspheric surfaces by 0.01 mm and is measured at ¾ of the field, whereby said lens system has reduced aspheric decenter sensitivity and wherein:

$\Delta_1 < 50$ waves $\Delta_2 < 250$ waves where $\Delta_1$ is the asphericity difference of the front surface of the lens element and $\Delta_2$ is the asphericity difference of the rear surface of the lens element.

23. A zoom lens according to claim 1, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$.

24. A zoom lens according to claim 2, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$ of the first optical unit.

25. A zoom lens according to claim 8, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component of the first optical unit $U_{1B}$.

26. A zoom lens according to claim 13, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$.

27. A zoom lens according to claim 14, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$.

28. A zoom lens according to claim 25 wherein:

$$\left| \frac{K_{1A}}{K_{1W}} \right| \leq 0.6,$$

where $K_{1W}$ is the power of the zoom lens system in a wide angle mode.

29. A zoom lens comprising two optical units of lens components, said zoom lens including from an object side, a first optical unit of positive power and a second optical unit of negative power and which zoom lens achieves zooming between a wide angle position and a narrow angle position by changing a distance between said first and said second optical units;

said first optical unit including two lens components and an aperture stop, a first lens component positioned on the object side of said first optical unit, said first lens component having at least one aspheric surface, and a second positive lens component positioned on the image side of said first optical unit;

one of said lens components of said two optical units has an aspheric surface which is characterized by radius of curvature and by asphericity difference Δ such that $Ti \leq 0.4$ mm, where Ti is the total image tilt of said zoom lens, produced by decentering of the aspheric surface by 0.01 mm and is measured at ¾ of the field, whereby said zoom lens has reduced aspheric decenter sensitivity, wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$.

30. A zoom lens comprising two optical units of lens components, said zoom lens including from a object side, a first optical unit of positive power and a second optical unit of negative power and which zoom lens achieves zooming between a wide angle position and a narrow angle position by changing a distance between said first and said second optical units;

said first optical unit including two lens components and an aperture stop, a first lens component positioned on the object side of said first optical unit, said first lens component having at least one aspheric surface, and a second positive lens component positioned on the image side of said first optical unit;

said second optical unit consists of a front positive lens component and a second negative lens component, wherein one of said lens components of said two optical units has an aspheric surface which is characterized by radius of curvature and by asphericity difference Δ such that $$Ti \leq 0.4 \text{ mm},$$

where Ti is the total image tilt of said zoom lens, produced by decentering of the aspheric surface by 0.01 mm and is measured at ¾ of the field, whereby said zoom lens has reduced aspheric decenter sensitivity wherein:

$$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$ of the first optical unit.

31. A zoom lens according to claim 13, $$\left| \frac{K_{1A}}{K_{1B}} \right| \leq 0.4,$$

where $K_{1A}$ is the power of the first lens component $U_{1A}$ and $K_{1B}$ is the power of the second lens component $U_{1B}$.

32. A zoom lens according to claim 29 having at least 3 aspheric surfaces.

33. A zoom lens according to claim 29, $$\left| \frac{K_{1A}}{K_{1W}} \right| \leq 0.6,$$

where $K_{1W}$ is the power of the zoom lens in a wide angle mode.

* * * * *